US011691542B2

(12) United States Patent
Hupp

(10) Patent No.: US 11,691,542 B2
(45) Date of Patent: Jul. 4, 2023

(54) ADJUSTMENT DEVICE FOR A VEHICLE SEAT AS WELL AS A VEHICLE SEAT

(71) Applicant: Faurecia Autositze GmbH, Hannover (DE)

(72) Inventor: Thomas Hupp, Minden (DE)

(73) Assignee: Faurecia Autositze GmbH, Hannover (DE)

( * ) Notice: Subject to any disclaimer, the term of this patent is extended or adjusted under 35 U.S.C. 154(b) by 0 days.

(21) Appl. No.: 17/513,074

(22) Filed: Oct. 28, 2021

(65) Prior Publication Data

US 2022/0134912 A1 May 5, 2022

(30) Foreign Application Priority Data

Oct. 29, 2020 (DE) ...................... 10 2020 128 422.5

(51) Int. Cl.
*B60N 2/10* (2006.01)
*B60N 2/16* (2006.01)
*B60N 2/02* (2006.01)

(52) U.S. Cl.
CPC ........... *B60N 2/165* (2013.01); *B60N 2/0232* (2013.01); *B60N 2/1615* (2013.01); *B60N 2002/0236* (2013.01)

(58) Field of Classification Search
CPC ...... B60N 2/165; B60N 2/1615; B60N 2/161; B60N 2/0232; B60N 2/164; B60N 2/1625; B60N 2/0224; B60N 2002/0236; B60N 2205/20

USPC .................................................... 297/344.17
See application file for complete search history.

(56) References Cited

U.S. PATENT DOCUMENTS

| 10,300,813 | B2  |  5/2019 | Kim |                    |
|------------|-----|---------|---------|----------------|
| 11,292,368 | B2* |  4/2022 | Behrens | ........ B60N 2/166 |
| 2009/0152433 | A1* |  6/2009 | Choi | ........... B60N 2/1635 |
| | | | | 248/421 |
| 2018/0009338 | A1* |  1/2018 | Kim | ............. B60N 2/1615 |
| 2020/0001749 | A1* |  1/2020 | Cieslak | ......... B60N 2/0232 |
| 2021/0229573 | A1* |  7/2021 | Fischer | ......... B60N 2/1625 |

FOREIGN PATENT DOCUMENTS

| DE | 102016001564 A1 | 8/2017 |
| DE | 102017100182 A1 | 1/2018 |
| DE | 102017206994 B4 | 1/2019 |
| WO | 2020207835 A1 | 10/2020 |

* cited by examiner

*Primary Examiner* — Mark R Wendell
(74) *Attorney, Agent, or Firm* — Barnes & Thornburg LLP

(57) ABSTRACT

The present disclosure relates to an adjustment device for a vehicle seat comprising adjusters adjustable in relation to one another, where on the first adjuster a toothed rack with an interlocking is hinged, and on the second adjuster a pinion is pivoted, the interlocking engaging with the pinion for adjusting the toothed rack and for moving the two adjusters in relation to one another, where, further, a toothed rack blocking element is affixed to the second adjuster, and the toothed rack, when adjusted, runs between the toothed rack blocking element and the pinion.

20 Claims, 3 Drawing Sheets

ADJUSTMENT DEVICE FOR A VEHICLE SEAT AS WELL AS A VEHICLE SEAT

PRIORITY CLAIM

This application claims priority under to German Patent Application No. DE 10 2020 128 422.5, filed Oct. 29, 2020, which is expressly incorporated by reference herein.

BACKGROUND

The present disclosure relates to an adjustment device for a vehicle seat for adjusting, in particular height adjusting, of the vehicle seat, as well as a vehicle seat.

SUMMARY

According to the present disclosure, an adjustment device for a vehicle seat allows for a comfortable adjustment of the vehicle seat with high flexibility and in a simple manner.

In illustrative embodiments, a spring means, for example a leaf spring or a similar spring, extends as a separate component between the toothed rack blocking element and an additional spring blocking element spaced apart from the former which is also directly or indirectly attached to the second adjuster.

In illustrative embodiments, the spring means, in a middle region located between the toothed rack blocking element and the spring blocking element, includes a curvature or bulge respectively oriented towards the toothed rack, where a pressure point of the curvature touches the toothed rack (at one of the narrow surfaces) exerting a pressure force (in the direction of the toothed rack) so as to bias the toothed rack or the gears respectively in the direction of the pinion.

In illustrative embodiments, this creates the advantage that, when there is a gap caused by or depending on tolerances between the toothed rack blocking element and the toothed rack, the toothed rack is pushed away from the toothed rack blocking element thereby compensating a play due to the existing gap. This minimizes, in a simple manner that, when the seating portion or, respectively, the toothed rack is put under load in operation of the vehicle seat, the toothed rack bangs against the toothed rack blocking element thereby creating disturbing noise. Hereby, in particular, the gap caused by tolerances is created when the gearing of the toothed rack lies in contact with the pinion in normal operation, whereby the gap is then preferably smaller than 1 mm, in particular, smaller than 0.5 mm.

In illustrative embodiments, using a separate spring means provides a solution in which the pressure force can be flexibly adapted to the corresponding vehicle seat or the application respectively. Moreover, this solution can also be used utilizing a stud bolt as toothed rack blocking element. This keeps the refitting effort small since the spring means can be mounted on the toothed rack blocking element or stud bolt respectively in a simple manner.

In illustrative embodiments, a separate component is used as spring means, i.e. the spring means is no integral part of the toothed rack blocking element itself. As such, the toothed rack blocking element, which may be realized as a stud bolt for example, provides in such adjustment devices that the toothed rack does not lift off from the pinion, in particular, under high load conditions. Independent of this function, according to the present disclosure, the spring means is provided a first end region of which can be connected in any suitable manner to the toothed rack blocking element in order to further enable the function of having the toothed rack biased in the direction of the pinion.

To achieve this, in addition to the toothed rack blocking element a spring blocking element is provided, the spring means also being in contact there with, for example, at a second end region. Hereby, the fact that the spring blocking element is spaced apart from the toothed rack blocking element is to be understood in that the spring means touches units spaced apart from one another or, respectively separate, so as to achieve in accordance with the present disclosure that the curvature lying in-between is able to press against the toothed rack. Hereby, in principle, the blocking elements as functional units may be connected to one another, for example via the side part of the sub-frame, as long as the function performed by the present disclosure can be fulfilled.

Hereby, the spring blocking element causes a limitation of movement (blocking) of the spring means at its other side (as seen from the curvature), i.e. e.g. the second end region, so that a first spring arm spring arm is created between the curvature and the toothed rack blocking element (first end region) and a second spring arm is created between the curvature and the spring blocking element. By virtue of the material of the spring means, the position of the blocking elements as well as the design of the curvature, both spring arms are designed in such a way that via the pressure point in the region of the curvature a certain pre-determined pressure force is transferred to the toothed rack so that this is biased via the gears in the direction of the pinion.

In illustrative embodiments, it is provided that the spring means in normal operation lies in contact with the corresponding narrow surface of the toothed rack merely in the region of the curvature without extensive force. Hereby, the pressure force is set such that in normal operation the toothed rack will not touch the toothed rack blocking element thereby avoiding undesired noises. Only in the event of excessive forces, in particular in the event of an impact, there may be a contact with the toothed rack blocking element, so as to exploit the desired functionality of the toothed rack blocking element.

In illustrative embodiments, it is further provided that the spring means is held movably or rigidly on the toothed rack blocking element, in particular, placed around the toothed rack blocking element and/or affixed thereto. This makes it possible, advantageously, to provide a variable attachment of the toothed rack blocking element e.g. on an existing stud bolt. Thus, the spring means may, for example, simply be clipped onto the stud bolt, whereby the spring means will subsequently be placed around the stud bolt, at least in part. Moreover, if the spring means is merely placed around the stud bolt (without any additional fixation), advantageously, it is possible to further achieve that the spring means can rotate about the bolt axis under a load emanating from the toothed rack so that it can better yield to the load.

In illustrative embodiments, the toothed rack blocking element designed as a stud bolt may be designed as having a round, oval, rectangular, or similar cross-section and accordingly project from the second adjuster or the side part respectively perpendicularly so as to enable the blocking effect.

In illustrative embodiments, it is further provided that the spring means is a leaf spring which is bent in the middle region between the toothed rack blocking element and the spring blocking element so as to form the curvature, where the leaf spring lies in contact with the toothed rack at a pressure point in the region of the curvature while forming a pressure force (in the direction of the toothed rack) so as to bias the toothed rack in the direction of the pinion. Using a leaf spring it is possible to achieve the placing around the toothed rack blocking element, the forming of the curvature, and the setting of the pressure force in a simple manner.

In illustrative embodiments, it is further provided that the curvature oriented towards the toothed rack is formed in a u shape or a v shape or having a curve contour with similar effect, whereby this can be achieved in a simple manner by means of reshaping. Hereby, it may be provided in a manner having a similar effect that an elevation projecting from the toothed rack is attached to the surface of the spring means which presses at a pressure point against the narrow surface of the toothed rack with the pressure force.

In illustrative embodiments, it is further provided that the spring blocking element is formed by a projection or bar projecting from the second adjuster (or, respectively, the side part or an element connected there with) which is spaced apart from the toothed rack blocking element or functionally separate there from respectively and with which the spring means is in biased contact. Thereby, the blocking of the movement of the spring for creating the bias is achieved in a simple manner, whereby, preferably, it is further provided that the spring means is in loose contact, i.e. without any additional fixation, with the projection or with the bar and/or the spring means is placed around the projection or the bar in a second end region. Since it is not necessary for the spring means to be affixed to the blocking elements in order to generate the bias, it may slide along them so that a compensating movement can happen upon a change of the effective force on the curvature of the spring means. Thereby, unnecessary tensions in the spring means can be avoided.

In illustrative embodiments, it is provided that the spring means with its second end region is placed around the spring blocking element in a u shaped manner so that this can be secured at the end in that the spring means encompasses e.g. the spring blocking element in the way of a bracket under a tension, or the spring means initially leads away from the toothed rack emanating from the curvature, bends in the direction of the toothed rack in an adjacent bending region, and in the second end region snatching under the spring blocking element by means of a hook under bias so as to create an alternative option for other space requirements.

In illustrative embodiments, it is further provided that the bar (spring blocking element) forms part of a first guide element, the first guide element also comprising a guide plate connected to the bar and extending parallel to a main surface of the toothed rack which limits movement of the toothed rack in a transverse direction. This enables the first guide element to fulfill a double function (lateral guide and biasing of the spring means) so that no additional elements are needed.

In illustrative embodiments, it is further provided that spring means also comprises at least one lateral guide rib which is part of a second guide element, the at least one guide rib am spring means being laterally bent such that it extends parallel to a main surface of the toothed rack so as to limit movement of the toothed rack in a transverse direction. Preferably, hereby, one bent guide rib each may be provided at each side of the toothed rack. Thus, advantageously, the spring means can also take over the guiding function so that no additional elements are needed here for. In principle, however, this type of lateral guide can also be combined with further guide elements, for example, the first guide element.

In illustrative embodiments, it is additionally provided that the pinion can be driven via an operating device, the operating device being an electric operating device or a manual operating device. Thus, the adjustment device can be adjusted manually, for example via a (pumping) lever, or electrically, for example via a motor. Hereby, it is assumed that the adjustment device comprises a first adjuster and a second adjuster adjustable in relation thereto, whereby the toothed rack is hinged on the first adjuster with the gears, and the pinion on the second adjuster is rotating mounted, where the toothed rack collaborates with the spring means connected to the second adjuster (loosely connected or firmly connected), biasing the toothed rack in the direction of the pinion, where the gears of the toothed rack engages with the pinion in such a way that upon rotation of the pinion about a pinion axis the toothed rack is adjusted, where by means of such an adjustment of the toothed rack the adjusters can be moved relative to one another.

In illustrative embodiments, it is provided that the adjustment device is adapted for carrying out a height adjustment of the vehicle seat, the first adjuster being a rear swing arm swivel mounted on the chassis, and the second adjuster being a side part of an underframe of a vehicle seat, with the rear swing arm being pivotable in relation to the side part by moving the toothed rack such that the underframe is adjusted, in particular, in a height adjustment direction. Thus, preferably, the adjustment device according to the present disclosure can be used in a height adjustment mechanism in which, due to a gap cause by tolerance, a play should be compensated, when disturbing noise is to be avoided during operation, in particular, when sitting down on the seating portion.

In illustrative embodiments, the present disclosure also provides for a vehicle seat including an underframe which is adjustable via swing arms mountable on the chassis, the underframe comprising a side part and cross members, the underframe collaborating with an adjustment device according to one of previous claims. Hereby, the vehicle seat may, for example, be arranged in the vehicle in a manner slideable in relation to the chassis via upper rails, the swing arms then being connected to the chassis via the slideable upper rails, or the swing arms are swivel mounted directly on the vehicle floor and not linearly slideable in relation to the chassis. In both cases, disturbing noises are avoided in normal operation of the vehicle seat because any play caused by the gap can be compensated by the spring means with the pressure force being suitably adjusted.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 3:
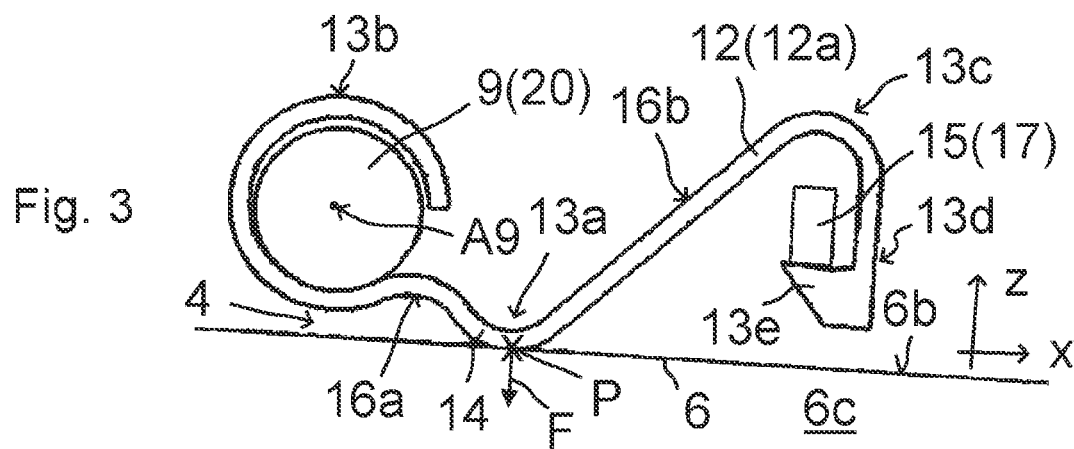
Figure 4:
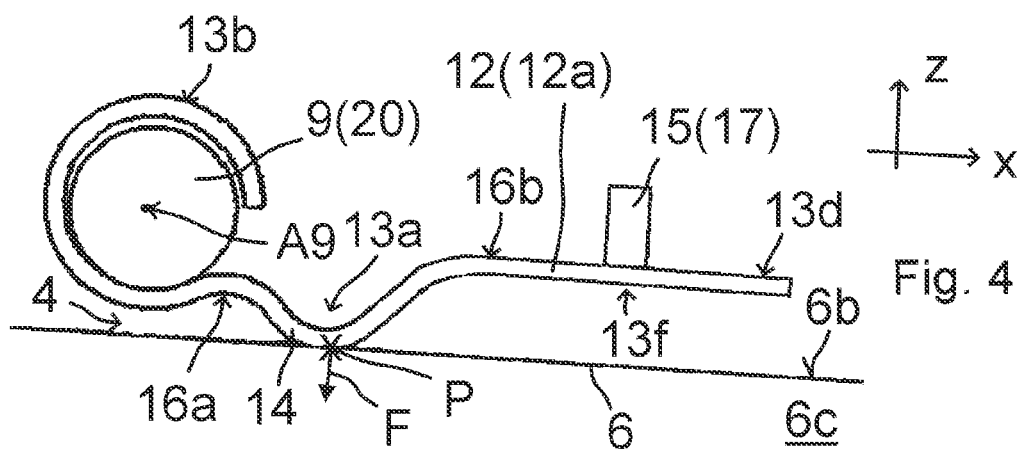
Figure 5:
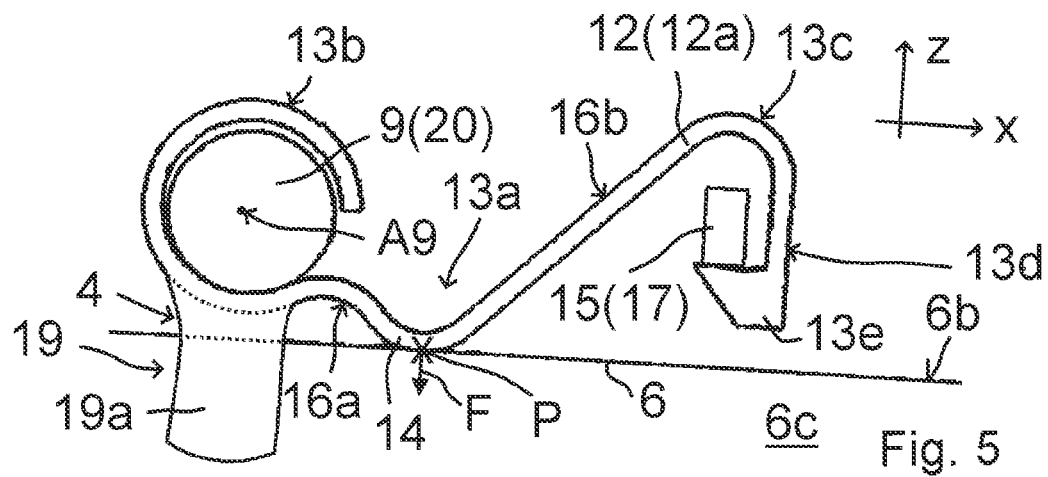
Figure 6:
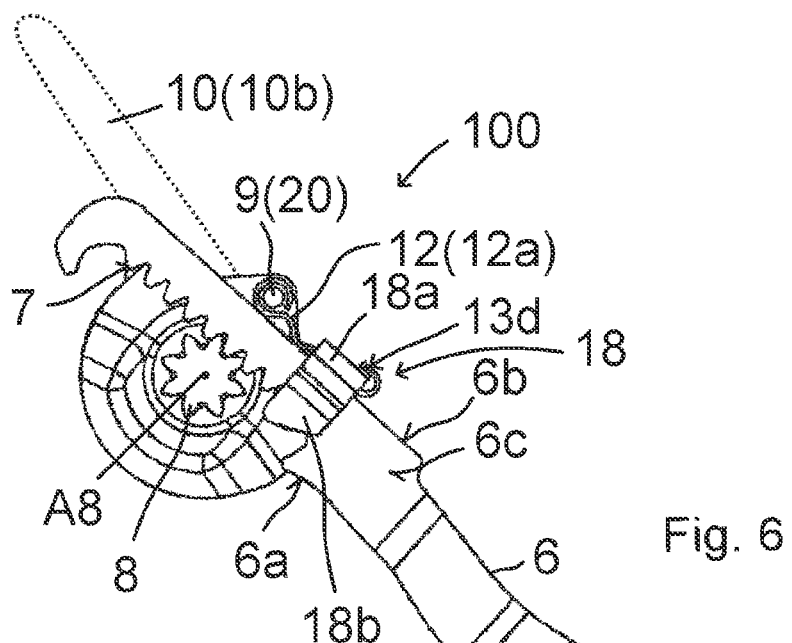

FIGS. 3, 4, and 5 are detail views of spring means in different embodiments; and FIG. 6 is a further embodiment of an adjustment device according to the present disclosure.

DETAILED DESCRIPTION

Figure 1:
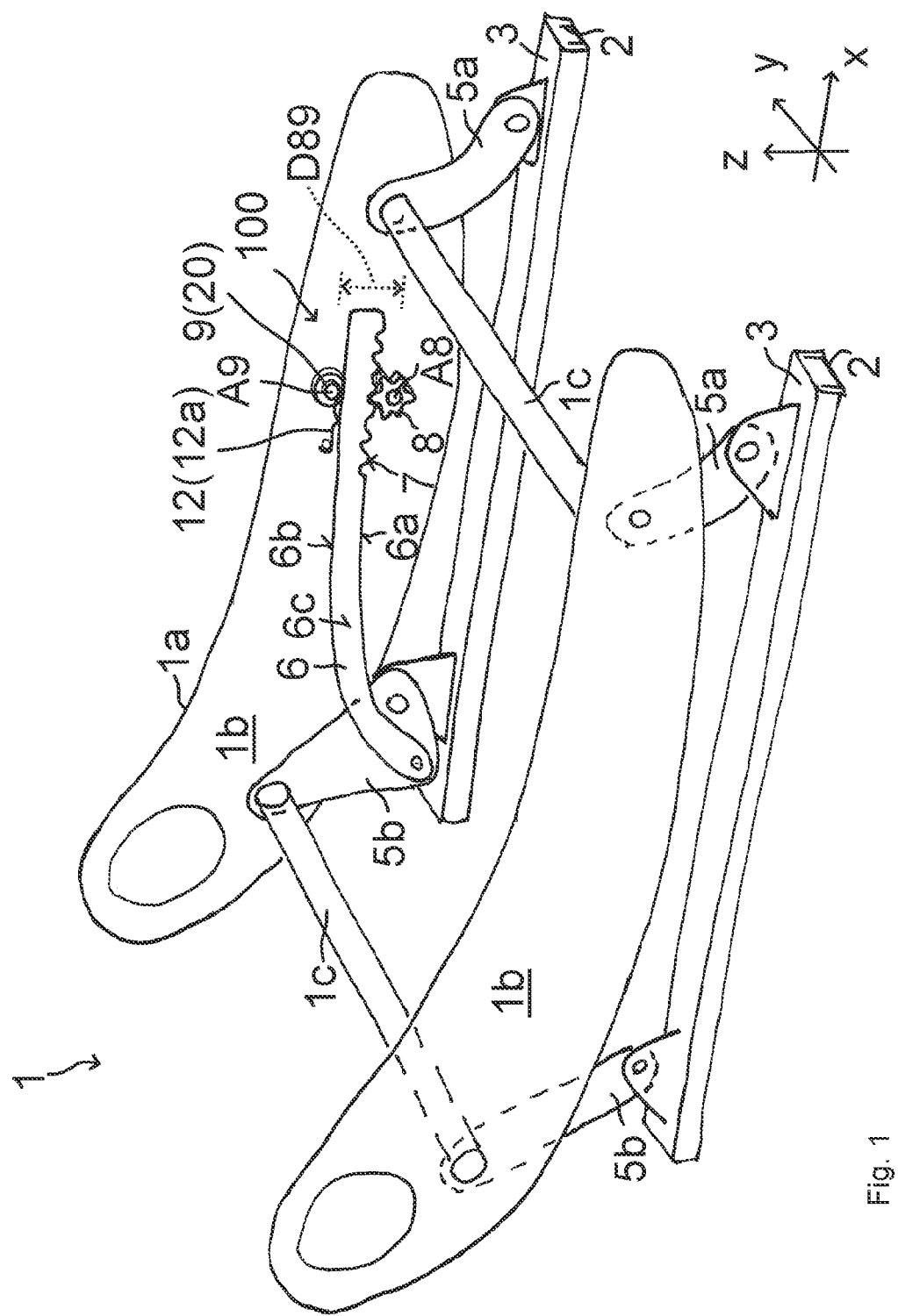
FIG. 1 is a schematic view of a vehicle seat.

FIG. 1 shows schematically and in sections an underframe 1a of a vehicle seat 1 including an adjustment device 100, where, usually, in or, respectively, by the underframe 1*a* a seating portion or, respectively, seat cushion is received. The vehicle seat 1 comprises lower rails 2 mounted firmly on the chassis, in which upper rails 3 are received so as to be longitudinally slidable. Two swing arms 5*a*, 5*b* each (front and rear side) are swivel mounted on the upper rails 3, via which the underframe 1*a* of the vehicle seat 1 can be adjusted in eight and/or possibly also in its inclination in relation to the upper rails 3 in the manner of a parallelogram adjustment. Hereby, the underframe 1*a* is formed by at least two side parts 1*b* and two cross members 1*c*, as shown in FIG. 1.

For the purpose of adjusting the underframe 1*a* a curved toothed rack 6 is hinged onto at least one of the rear swing arms 5*b*, the rack, upon adjustment in a longitudinal direction X, swiveling the at least one rear swing arm 5*b* (as first adjuster of the adjustment device 100) to which it is hinged in such a way that the underframe 1*a* is adjusted at least in one height adjustment direction Z upwards or downwards. At the same time, an inclination adjustment may also be provided. Via the cross members 1*c* or, respectively, the side parts 1*b* of the underframe 1*a* the other swing arms 5*a*, 5*b* are also carried along automatically so that the seating portion and the back rest (not shown) of the vehicle seat 1 in total is raised or lowered evenly. In principle, the other rear swing arm 5*b* of the vehicle seat 1, too, may directly collaborate in the same manner with a toothed rack, via which also a pivoting movement (preferably synchronized) can be induced in the other rear swing arm 5*b*.

Figure 2:
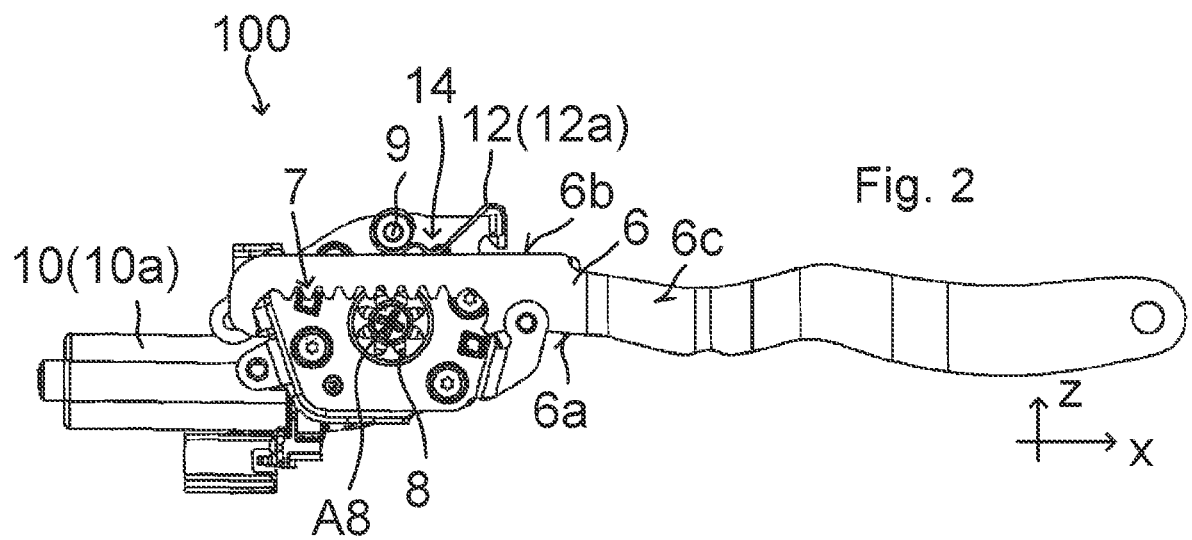
FIG. 2 is a first embodiment of an adjustment device according to the present disclosure.

The adjustment of the toothed rack 6 in the longitudinal direction X is caused by an interlocking 7 which, according to the embodiment shown here, is arranged at an underside 6*a* (lower narrow surface) of the toothed rack 6. A pinion 8 disposed beneath the toothed rack 6 engages with the interlocking 7. Hereby, the pinion 8 is pivoted at the side part 1*b* as second adjuster of the adjustment device 100 which can be adjusted relative to the first adjuster (rear swing arm 5*b*). Das pinion 8 can be driven and thereby set in rotation via an operating device 10, i.e. an electric operating device 10*a* (s. FIG. 2), for example an electric motor, or a manual operating device 10*b* (s. FIG. 6), for example a (pump) lever.

This allows the toothed rack 6 lying on the pinion 8 via the interlocking 7 to be adjusted depending on the drive direction of the pinion 8 in the longitudinal direction X, and this longitudinal movement to be induced into the at least one rear swing arm 5*b* for a height adjustment of the underframe 1*a* in relation to the chassis of the vehicle. Via a corresponding latching mechanism (not shown) the currently adjusted height position (possibly even the tilt position) can be maintained.

In order to block the toothed rack 6 from lifting off of the pinion 8, further, a perpendicularly projecting stud bolt 9 is attached to the side part 1*b* as toothed rack blocking element 20 which, in the embodiment shown, is disposed above the toothed rack 6. Thus, when longitudinally adjusted, the toothed rack 6 is guided through a region which on its lower side is limited by the pinion 8 and on its upper side by the stud bolt 9 or, respectively, the toothed rack blocking element 20.

In order to enable, by means of this construction, a failure-free adjustment of the toothed rack 6 in the longitudinal direction X, an axis spacing D89 between a pinion axis A8 of the pinion 8 and a bolt axis A9 of the stud bolt 9 is to be defined as precisely as possible. Hereby, it should be ensured both that the toothed rack 6 does not get jammed between the stud bolt 9 and the pinion 8 (axis spacing D89 too small) and that the axis spacing D89 between the two axes A8, A9 is not too wide. A too wide axis spacing D89 causes a gap 4 to form between an upper side 6*b* (upper narrow surface) of the toothed rack 6 and the stud bolt 9. When the seating portion is placed under load by a passenger or during operation of the vehicle, this leads to the toothed rack 6 potentially lifting off of the pinion 8 and the upper side 6*b* of the toothed rack 6 banging against the stud bolt 9. This can generate noise perceived as disturbing by the passenger.

Due to manufacturing tolerance (pinion 8, bearing stud 9 and toothed rack 6) the formation of a gap 4 cannot be avoided and is therefore accepted as given. In order to nevertheless avoid the generation of disturbing noise, according to the present disclosure, an additional spring means 12 is provided which, according to the embodiment shown, is realized by way of a leaf spring 12*a*. However, the spring means 12 may be another equally effective spring means which acts in a similar manner and can be positioned in a similar manner. The leaf spring 12*a* is provided with a curvature 14 in a middle region 13*a*, represented in the Figures as a u shaped curvature. However, the curvature 14 may also be v shaped or designed as having a comparable curve profile, whereby the curvature 14 in all cases may be formed, for example, by bending the leaf spring 12*a*. The curvature 14 is oriented towards the upper side 6*b* of the toothed rack 6 so that the curvature 14 of the leaf spring 12*a* lies in contact with the upper side 6*b* of the toothed rack 6 and is able to slide thereon in case of longitudinal movement of the toothed rack 6. Equally effective, the curvature 14 may also be designed as a local thickening of the leaf spring 12*a* in the middle region 13*a* in the direction of the upper side 6*b* of the toothed rack 6.

Emanating from the middle region 13*a* the leaf spring 12*a* extends in the direction of the stud bolt 9, where a first end region 13*b* of the leaf spring 12*a* is wrapped around the stud bolt 9 at an angle of larger than 270°. This retains the end of the leaf spring 12*a* on the stud bolt 9. Owing to the wrapping around, no additional fixation of the leaf spring 12*a* on the stud bolt 9 is needed so that the leaf spring 12*a* can rotate about the bolt axis A9 of the stud bolt 9. In other embodiments, however, the end of the leaf spring 12*a* may be affixed to the stud bolt 9 in other ways (hinged or non-rotatable).

Emanating from the middle part 13*a* the leaf spring 12*a* extends in the other towards a spring blocking element 15 with which it is in loose contact under a bias. According to the detailed view in the FIGS. 3 through 5, the spring blocking element 15 is formed by a projection 17 which projects perpendicularly from the side part 1*b* or an element firmly affixed to the side part and which prevents an upwards adjustment of the leaf spring 12*a*, i.e. blocks the spring means or, respectively, the leaf spring 12*a*.

According to FIG. 3 and FIG. 5, it is provided that the leaf spring 12*a*, emanating from the curvature 14 in the middle region 13*a*, initially extents upwards, is bent downwards in an adjacent bending region 13*c* and subsequently terminates in a second end region 13*d*. In the second end region 13*d* a hook 13*e* is arranged which engages under the spring blocking element 15 so as to block upwards adjustment of the leaf spring 12*a*. In the embodiment according to FIG. 4, the leaf spring 12*a*, emanating from the curvature 14 in the middle region 13*a*, is guided without any additional curvature below the spring blocking element 15, whereby a contact region 13*f* of the leaf spring 12*a* lies in loose contact under a bias with the spring blocking element 15 which blocks upwards adjustment of the leaf spring 12*a*. The additional hook 13*e* is omitted in this embodiment.

According to the embodiment in FIG. 6, the spring blocking element 15 is formed by a bar 18a of a first guide element 18 projecting perpendicularly form the side part 1b. The second end region 13d of the leaf spring 12a is wrapped in a u shaped manner around the bar 18a of the guide element 15b projecting perpendicularly from the side part 1b so as to secure the end of the leaf spring 12a and at the same time block upwards adjustment of the leaf spring 12a. In the same way, the second end region 16b of the leaf spring 12a, too, can be wrapped in a u shaped manner around the projection 17, according to e.g. FIG. 4. The first guide element 18 serves to limit movement of the toothed rack 6 in a transverse direction Y or, respectively, provide lateral guidance to the toothed rack 6 to prevent the toothed rack 6 from falling out on the side. To that end, a guide plate 18b extending parallel to a main surface 6c of the toothed rack 6 is provided on the bar 18a projecting perpendicularly from the side part.

According to FIG. 5, the lateral guide may be attained also in that lateral guide ribs 19a are arranged, preferably on both sides, in the first end region 13a of the leaf spring 12a below the stud bolt 9 as a second guide element 19. These are bent downwards as integral parts of the leaf spring 12a thereby lying laterally of the two main surfaces 6c of the toothed rack 6 (essentially parallel thereto). This, too, can avoid any shifting of the toothed rack 6 in the transverse direction Y. However, the lateral guide can be realized by any other means.

In all aforementioned embodiments, due to the bias formed via the respective spring blocking element 15, the leaf spring's 12a curvature 14 at a pressure point P presses against the upper side 6b of the toothed rack 6 with a certain pressure force F so that, when there is a gap 4 caused by tolerance, the toothed rack 6 is pushed away from the stud bolt 9 and the toothed rack 6 or, respectively, the interlocking 7 is therefore biased in the direction of the pinion 8. Thus, when the toothed rack 6 is longitudinally adjusted, it is not the stud bolt 9 but the curvature 14 at the pressure point P that slides along the upper side 6b of the toothed rack 6. In order for that to remain the case even under normal loads or, respectively, during normal operation of the vehicle seat, in particular also when a somewhat heavier person sits down, the pressure force F is set by means of a corresponding dimensioning and positioning of the leaf spring 12a such that a force acting upwards on the toothed rack 6 (towards the stud bolt 9) in normal operation will always be smaller than the pressure force F exerted by the leaf spring 12a in the region of the curvature 14 or, respectively, the pressure point P.

This can be adjusted, for example, by means of prior conducted simulations and/or test runs under realistic conditions with a passenger having a corresponding weight, where both a spring constant K of the leaf spring 12a or, respectively, the spring means 12 in general and/or a shape of the curvature 14 and/or a positioning of the respective spring blocking element 15 (17; 18a) and/or a length L1, L2 of spring arms 16a, 16b may contribute to change the pressure force F accordingly. Hereby, the spring arms 16a, 16b extent between the pressure point P in the middle region 13a and the first end region 13b or, respectively, between the pressure point P in the middle region 13a and the spring blocking element 15.

Comparative vehicle seats may comprise an adjustable seating portion which can be adjusted in its height and/or its inclination. Hereby, the seating portion which comprises an underframe is mounted, for example, in lower rails attached to the chassis via upper rails in a manner that is longitudinally slideable. The underframe of the seating portion generally comprises two side parts connected to one another in perpendicular direction by a front and a back cross member or other structural parts. The side parts collaborate with swing arms pivotable together with the upper rails and the side parts allowing for a parallelogram adjustment of the seating portion or, respectively, of the vehicle seat. In a design of the vehicle seat that is not longitudinally adjustable the swing arms are attached to the chassis by other means accordingly.

In order to adjust the comparative vehicle seat the swing arms, in particular the rear swing arms, are adjusted via a toothed rack hinged to the swing arm, engaging, via an interconnection, a pinion firmly attached to the side part. When the pinion is driven manually or electrically a purposeful adjustment of the seating portion can be attained. In order to block the toothed rack from lifting off from the pinion, usually, the toothed rack will extend between the pinion and an additional toothed rack blocking element which prevents the toothed rack from lifting off in case of strong forces, in particular in the case of an impact.

A comparative toothed rack blocking element includes, in particular, an upper contact arm which may be designed resilient. Thus, the comparative toothed rack blocking element is also designed to be an elasticity means. This upper contact arm is oriented with radial play towards the upper side of the toothed rack, or it slides below a bias on an upper side of the toothed rack, so that a gap caused by tolerance between the toothed rack blocking element and the toothed rack can be compensated because the elasticity means biases the toothed rack in the direction of the pinion.

A disadvantage herein is that the actual function of the comparative toothed rack blocking element is combines with the function of the elasticity means for biasing the toothed rack. This fact makes this design less flexible because it must primarily be ascertained that the toothed rack does not lift off in the presence of strong forces, in particular in the event of an impact. This limits the setting of a bias and the design allows less flexible adjustment. Moreover, this variant cannot be combined with adjustment devices using a stud bolt or similar as toothed rack blocking element.

Furthermore, a comparative flexible guided sliding element into a housing of the toothed rack blocking element which is biased via a tensioning device (spring means) and presses against the upper side of the toothed rack. This causes the comparative toothed rack with the gearing to be biased in the direction of the pinion. In this variant, too, the spring means is integrated in the toothed rack blocking element making the design less flexible.

Therefore, the present disclosure provides an adjustment device for a vehicle seat allowing for a comfortable adjustment of the vehicle seat with high flexibility and in a simple manner.

Thus, according to the present disclosure, the spring means, for example a leaf spring or a similar spring, extends as a separates component between the toothed rack blocking element and an additional spring blocking element spaced apart from the former which is also directly or indirectly attached to the second adjuster, where the spring means, in a middle region located between the toothed rack blocking element and the spring blocking element, includes a curvature or bulge respectively oriented towards the toothed rack, where a pressure point of the curvature touches the toothed rack (at one of the narrow surfaces) exerting a pressure force (in the direction of the toothed rack) so as to bias the toothed rack or the gears respectively in the direction of the pinion.

This creates the advantage that, when there is a gap caused by or depending on tolerances between the toothed rack blocking element and the toothed rack, the toothed rack is pushed away from the toothed rack blocking element thereby compensating a play due to the existing gap. This prevent in a simple manner that, when the seating portion or, respectively, the toothed rack is put under load in operation of the vehicle seat, the toothed rack bangs against the toothed rack blocking element thereby creating disturbing noise. Hereby, in particular, the gap caused by tolerances is created when the gearing of the toothed rack lies in contact with the pinion in normal operation, whereby the gap is then preferably smaller than 1 mm, in particular, smaller than 0.5 mm.

Using separate spring means provides a simple solution in which the pressure force can be flexibly adapted to the corresponding vehicle seat or the application respectively. Moreover, this solution can also be used utilizing a stud bolt as toothed rack blocking element. This keeps the refitting effort small since the spring means can be mounted on the toothed rack blocking element or stud bolt respectively in a simple manner.

According to the present disclosure, a separate component is used as spring means, i.e. the spring means is no integral part of the toothed rack blocking element itself. As such, the toothed rack blocking element, which may be realized as a stud bolt for example, provides in such adjustment devices that the toothed rack does not lift off from the pinion, in particular, under high load conditions. Independent of this function, according to the present disclosure, the spring means is provided a first end region of which can be connected in any suitable manner to the toothed rack blocking element in order to further enable the function of having the toothed rack biased in the direction of the pinion.

To achieve this, in addition to the toothed rack blocking element a spring blocking element is provided, the spring means also being in contact there with, for example, at a second end region. Hereby, the fact that the spring blocking element is spaced apart from the toothed rack blocking element is to be understood in that the spring means touches units spaced apart from one another or, respectively separate, so as to achieve in accordance with the present disclosure that the curvature lying in-between is able to press against the toothed rack. Hereby, in principle, the blocking elements as functional units may be connected to one another, for example via the side part of the sub-frame, as long as the function performed by the present disclosure can be fulfilled.

Hereby, the spring blocking element causes a limitation of movement (blocking) of the spring means at its other side (as seen from the curvature), i.e. e.g. the second end region, so that a first spring arm spring arm is created between the curvature and the toothed rack blocking element (first end region) and a second spring arm is created between the curvature and the spring blocking element. By virtue of the material of the spring means, the position of the blocking elements as well as the design of the curvature, both spring arms are designed in such a way that via the pressure point in the region of the curvature a certain pre-determined pressure force is transferred to the toothed rack so that this is biased via the gears in the direction of the pinion.

It is provided that the spring means in normal operation lies in contact with the corresponding narrow surface of the toothed rack merely in the region of the curvature without extensive force. Hereby, the pressure force is set such that in normal operation the toothed rack will not touch the toothed rack blocking element thereby avoiding undesired noises. Only in the event of excessive forces, in particular in the event of an impact, there may be a contact with the toothed rack blocking element, so as to exploit the desired functionality of the toothed rack blocking element.

It is further provided that the spring means is held movably or rigidly on the toothed rack blocking element, in particular, placed around the toothed rack blocking element and/or affixed thereto. This makes it possible, advantageously, to provide a variable attachment of the toothed rack blocking element e.g. on an existing stud bolt. Thus, the spring means may, for example, simply be clipped onto the stud bolt, whereby the spring means will subsequently be placed around the stud bolt, at least in part. Moreover, if the spring means is merely placed around the stud bolt (without any additional fixation), advantageously, it is possible to further achieve that the spring means can rotate about the bolt axis under a load emanating from the toothed rack so that it can better yield to the load.

The toothed rack blocking element designed as a stud bolt may be designed as having a round, oval, rectangular, or similar cross-section and accordingly project from the second adjuster or the side part respectively perpendicularly so as to enable the blocking effect.

It is further provided that the spring means is a leaf spring which is bent in the middle region between the toothed rack blocking element and the spring blocking element so as to form the curvature, where the leaf spring lies in contact with the toothed rack at a pressure point in the region of the curvature while forming a pressure force (in the direction of the toothed rack) so as to bias the toothed rack in the direction of the pinion. Using a leaf spring it is possible to achieve the placing around the toothed rack blocking element, the forming of the curvature, and the setting of the pressure force in a simple manner.

It is further provided that the curvature oriented towards the toothed rack is formed in a u shape or a v shape or having a curve contour with similar effect, whereby this can be achieved in a simple manner by means of reshaping. Hereby, it may be provided in a manner having a similar effect that an elevation projecting from the toothed rack is attached to the surface of the spring means which presses at a pressure point against the narrow surface of the toothed rack with the pressure force.

It is further provided that the spring blocking element is formed by a projection or bar projecting from the second adjuster (or, respectively, the side part or an element connected there with) which is spaced apart from the toothed rack blocking element or functionally separate there from respectively and with which the spring means is in biased contact. Thereby, the blocking of the movement of the spring for creating the bias is achieved in a simple manner, whereby, preferably, it is further provided that the spring means is in loose contact, i.e. without any additional fixation, with the projection or with the bar and/or the spring means is placed around the projection or the bar in a second end region. Since it is not necessary for the spring means to be affixed to the blocking elements in order to generate the bias, it may slide along them so that a compensating movement can happen upon a change of the effective force on the curvature of the spring means. Thereby, unnecessary tensions in the spring means can be avoided.

It is provided that the spring means with its second end region is placed around the spring blocking element in a u shaped manner so that this can be secured at the end in that the spring means encompasses e.g. the spring blocking element in the way of a bracket under a tension, or the spring means initially leads away from the toothed rack emanating from the curvature, bends in the direction of the toothed rack in an adjacent bending region, and in the second end region snatching under the spring blocking element by means of a hook under bias so as to create an alternative option for other space requirements.

It is further provided that the bar (spring blocking element) forms part of a first guide element, the first guide element also comprising a guide plate connected to the bar and extending parallel to a main surface of the toothed rack which limits movement of the toothed rack in a transverse direction. This enables the first guide element to fulfill a double function (lateral guide and biasing of the spring means) so that no additional elements are needed.

It is further provided that spring means also comprises at least one lateral guide rib which is part of a second guide element, the at least one guide rib am spring means being laterally bent such that it extends parallel to a main surface of the toothed rack so as to limit movement of the toothed rack in a transverse direction. Preferably, hereby, one bent guide rib each may be provided at each side of the toothed rack. Thus, advantageously, the spring means can also take over the guiding function so that no additional elements are used here for. In principle, however, this type of lateral guide can also be combined with further guide elements, for example, the first guide element.

It is additionally provided that the pinion can be driven via an operating device, the operating device being an electric operating device or a manual operating device. Thus, the adjustment device can be adjusted manually, for example via a (pumping) lever, or electrically, for example via a motor. Hereby, it is assumed that the adjustment device comprises a first adjuster and a second adjuster adjustable in relation thereto, whereby the toothed rack is hinged on the first adjuster with the gears, and the pinion on the second adjuster is rotating mounted, where the toothed rack collaborates with the spring means connected to the second adjuster (loosely connected or firmly connected), biasing the toothed rack in the direction of the pinion, where the gears of the toothed rack engages with the pinion in such a way that upon rotation of the pinion about a pinion axis the toothed rack is adjusted, where by means of such an adjustment of the toothed rack the adjusters can be moved relative to one another.

It is provided that the adjustment device is adapted for carrying out a height adjustment of the vehicle seat, the first adjuster being a rear swing arm swivel mounted on the chassis, and the second adjuster being a side part of an underframe of a vehicle seat, with the rear swing arm being pivotable in relation to the side part by moving the toothed rack such that the underframe is adjusted, in particular, in a height adjustment direction. Thus, preferably, the adjustment device according to the present disclosure can be used in a height adjustment mechanism in which, due to a gap cause by tolerance, a play should be compensated, when disturbing noise is to be avoided during operation, in particular, when sitting down on the seating portion.

The present disclosure also provides for a vehicle seat including an underframe which is adjustable via swing arms mountable on the chassis, the underframe comprising a side part and cross members, the underframe collaborating with an adjustment device according to one of previous claims. Hereby, the vehicle seat may, for example, be arranged in the vehicle in a manner slideable in relation to the chassis via upper rails, the swing arms then being connected to the chassis via the slideable upper rails, or the swing arms are swivel mounted directly on the vehicle floor and not linearly slideable in relation to the chassis. In both cases, disturbing noises are avoided in normal operation of the vehicle seat because any play caused by the gap can be compensated by the spring means with the pressure force being suitably adjusted.

The present disclosure relates to an adjustment device (100) for a vehicle seat comprising adjusters adjustable in relation to one another, where on the first adjuster a toothed rack (6) with an interlocking (7) is hinged, and on the second adjuster a pinion (8) is pivoted, the interlocking (7) engaging with the pinion (8) for adjusting the toothed rack (6) and for moving the two adjusters in relation to one another, where, further, a toothed rack blocking element (20) is affixed to the second adjuster, and the toothed rack (6), when adjusted, runs between the toothed rack blocking element (20) and the pinion (8).

The spring means (12) extends as a separate component between the toothed rack blocking element (20) and a spring blocking element (15) spaced apart there from, the spring means (12)

The present disclosure provides for a spring means (12) to extend as a separate component between the toothed rack blocking element (20) and a spring blocking element (15) spaced apart there from, the spring means (12) comprising a curvature (14) oriented towards the toothed rack (6) in a middle region (13a) located between the toothed rack blocking element (20) and the spring blocking element (15), the curvature (14) being in contact with the toothed rack (6) at a pressure point (P) while exerting a pressure force (F) so as to bias the toothed rack (6) in the direction of the pinion (8).

The following numbered clauses include embodiments that are contemplated and non-limiting:

Clause 1. An adjustment device (100) for a vehicle seat (1) comprising a first adjuster (5b) and a second adjuster (1b) adjustable in relation thereto, where on the first adjuster (5b) a toothed rack (6) with an interlocking (7) is hinged, and on the second adjuster (1b) a pinion (8) is pivoted, where the toothed rack (6) collaborates with a spring means (12) coupled to the second adjuster (1b), the spring means (12) biasing the toothed rack (6) in the direction of the pinion (8), the interlocking (7) of the toothed rack (6) engaging with the pinion (8) in such a way that the toothed rack (6) is adjusted when the pinion (8) is rotated about a pinion axis (A8), where by means of such adjustment of the toothed rack (6) the adjusters (5b, 1b) can be moved in relation to one another, where, further, a toothed rack blocking element (20) is affixed to the second adjuster (1b), and the toothed rack (6), when adjusted, runs between the toothed rack blocking element (20) and the pinion (8), wherein the spring means (12) extends as a separate component between the toothed rack blocking element (20) and a spring blocking element (15) spaced apart there from, the spring means (12) comprising a curvature (14) oriented towards the toothed rack (6) in a middle region (13a) located between the toothed rack blocking element (20) and the spring blocking element (15), the curvature (14) being in contact with the toothed rack (6) at a pressure point (P) while exerting a pressure force (F) so as to bias the toothed rack (6) in the direction of the pinion (8).

Clause 2. The adjustment device (100) according to clause 1, wherein the spring means (12) is held movably or rigidly on the toothed rack blocking element (20), in particular wrapped around the toothed rack blocking element (20) and/or affixed thereto, where the toothed rack blocking element (20) is, for example, a stud bolt (9) projecting off of the second adjuster (1b).

Clause 3. The adjustment device (100) according to clause 1 or 2, wherein between the toothed rack blocking element (20) and the toothed rack (6) a gap (4) is formed when the interlocking (7) of the toothed rack (6) is in contact with the pinion (8), where the gap (4) is preferably smaller than 1 mm, in particular, smaller than 0.5 mm.

Clause 4. The adjustment device (100) according to one of the above clauses, wherein the spring means (12) is a leaf spring (12a) which is bent in the middle region (13a) between the toothed rack guide element (20) and the spring blocking element (15) so as to form the curvature (14), where the leaf spring (12a) is in contact with the toothed rack (6) at a pressure point (P) in the region of the curvature (14) so as to bias the toothed rack (6) in the direction of the pinion (8).

Clause 5. The adjustment device (100) according to one of the above clauses, wherein the curvature (14) oriented towards the toothed rack (6) is formed in a u shaped or v shaped manner.

Clause 6. The adjustment device (100) according to one of the above clauses, wherein the spring blocking element (15) is formed by a projection (17) or bar (18a) projecting off of the second adjuster (1b), the projection being spaced apart from the toothed rack blocking element (20), and the spring means (12) being in biased contact with the projection.

Clause 7. The adjustment device (100) according to clause 6, wherein the spring means (12) is in loose contact with the projection (17) or the bar (18a), and/or a second end region (13d) of the spring means (12) is wrapped around the projection (17) or the bar (18a).

Clause 8. The adjustment device (100) according to clause 7, wherein the second end region (13d) of the spring means (12) is wrapped around the spring blocking element (15) in a u shaped manner, or the spring means (12) initially leads away from the toothed rack (6) emanating from the curvature (14), bends in the direction of the toothed rack (6) in an adjacent bending region (13c), and in the second end region (13d) snatches under the spring blocking element (15) by means of a hook (13e) under bias.

Clause 9. The adjustment device (100) according to one of the clauses 6 through 8, wherein the bar (18a) is part of a first guide element (18), the first guide element (18) further comprising a guide plate (18b) connected to the bar (18a) and extending parallel to a main surface (6c) of the toothed rack (6) limiting movement of the toothed rack (6) in a transverse direction (Y).

Clause 10. The adjustment device (100) according to one of the above clauses, wherein the spring means (12) further comprises at least one lateral guide rib (19a) which is part of a second (19), the at least one guide rib (19a) being bent laterally at the spring means (12) in such a way that it extends parallel to a main surface (6c) of the toothed rack 6) so as to limit movement of the toothed rack (6) in a transverse direction (Y).

Clause 11. The adjustment device (100) according to one of the above clauses, wherein the pinion (6) can be driven via an operating device (10), the operating device (10) being an electric operating device (10a) or a manual operating device (10b).

Clause 12. The adjustment device (100) according to one of the above clauses, wherein the adjustment device (100) is adapted for height adjustment of the vehicle seat (1), the first adjuster being a rear swing arm (5b) which is pivoting mounted on the chassis, and the second adjuster (1b) being a side part (1b) of an underframe (1a) of a vehicle seat (1), the rear swing arm (5b) being pivotable in relation to the side part (1b) by moving the toothed rack (6) in such a way that the underframe (1a) is adjusted in a height adjustment direction (Z).

Clause 13. A vehicle seat (1) including an underframe (1a) which is adjustable via swing arms (5a, 5b) which can be mounted on the chassis, the underframe (1a) comprising a side part (1b) and cross members (1c), where the underframe (1a) collaborates with an adjustment device (100) according to one of the above clauses.

The invention claimed is:

1. An adjustment device for a vehicle seat comprising a first adjuster and a second adjuster adjustable in relation thereto, where on the first adjuster a toothed rack with an interlocking is hinged, and on the second adjuster a pinion is pivoted, where the toothed rack collaborates with a spring means coupled to the second adjuster, the spring means biasing the toothed rack in the direction of the pinion, the interlocking of the toothed rack engaging with the pinion in such a way that the toothed rack is adjusted when the pinion is rotated about a pinion axis, where by means of such adjustment of the toothed rack the adjusters can be moved in relation to one another, wherein a toothed rack blocking element is affixed to the second adjuster, and the toothed rack, when adjusted, runs between the toothed rack blocking element and the pinion, wherein the spring means extends as a separate component between the toothed rack blocking element and a spring blocking element spaced apart there from, the spring means comprising a curvature oriented towards the toothed rack in a middle region located between the toothed rack blocking element and the spring blocking element, the curvature being in contact with the toothed rack at a pressure point while exerting a pressure force so as to bias the toothed rack in the direction of the pinion, the curvature being formed by plastically or non-elastically bending the spring means in the middle region between the toothed rack blocking element and the spring blocking element so as to permanently form the curvature by means of reshaping.

2. The adjustment device of claim 1, wherein the spring means is held movably or rigidly on the toothed rack blocking element via wrapping the spring means around the toothed rack blocking element and/or being affixed thereto, where the toothed rack blocking element is a stud bolt projecting off of the second adjuster.

3. The adjustment device of claim 1, wherein between the toothed rack blocking element and the toothed rack a gap is formed when the interlocking of the toothed rack is in contact with the pinion, where the gap is smaller than 0.5 mm.

4. The adjustment device of claim 1, wherein the spring means is a leaf spring which is bent in the middle region between the toothed rack blocking element and the spring blocking element so as to form the curvature, where the leaf spring is in contact with the toothed rack at the pressure point in the middle region of the curvature so as to bias the toothed rack in the direction of the pinion.

5. The adjustment device of claim 1, wherein the curvature oriented towards the toothed rack is formed in a u shaped or v shaped manner.

6. The adjustment device of claim 1, wherein the spring blocking element is formed by a projection or bar projecting off of the second adjuster, the projection being spaced apart from the toothed rack blocking element, and the spring means being in biased contact with the projection.

7. The adjustment device of claim 6, wherein the spring means is in loose contact with the projection or the bar, and/or a second end region of the spring means is wrapped around the projection or the bar.

8. The adjustment device of claim 7, wherein the second end region of the spring means is wrapped around the spring blocking element in a u shaped manner, or the spring means initially leads away from the toothed rack emanating from the curvature, bends in the direction of the toothed rack in an adjacent bending region, and in the second end region snatches under the spring blocking element by means of a hook under bias.

9. The adjustment device of claim 6, wherein the bar is part of a first guide element, the first guide element further comprising a guide plate connected to the bar and extending parallel to a main surface of the toothed rack limiting movement of the toothed rack in a transverse direction.

10. The adjustment device of claim 1, wherein the spring means further comprises at least one lateral guide rib which is part of a second guide element, the at least one lateral guide rib being bent laterally at the spring means in such a way that it extends parallel to a main surface of the toothed rack so as to limit movement of the toothed rack in a transverse direction.

11. The adjustment device of claim 1, wherein the pinion can be driven via an operating device, the operating device being an electric operating device or a manual operating device.

12. The adjustment device of claim 1, wherein the adjustment device is adapted for height adjustment of the vehicle seat, the first adjuster being a rear swing arm which is pivoting mounted on a chassis, and the second adjuster being a side part of an underframe of the vehicle seat, the rear swing arm being pivotable in relation to the side part by moving the toothed rack in such a way that the underframe is adjusted in a height adjustment direction.

13. A vehicle seat including an underframe which is adjustable via swing arms which can be mounted on a chassis, the underframe comprising a side part and cross members, where the underframe collaborates with the adjustment device of claim 1.

14. An adjustment device for a vehicle seat comprising
a first adjuster and a second adjuster adjustable in relation thereto, where on the first adjuster a toothed rack with an interlocking is hinged, and on the second adjuster a pinion is pivoted, where the toothed rack collaborates with a spring means coupled to the second adjuster, the spring means biasing the toothed rack in the direction of the pinion,
the interlocking of the toothed rack engaging with the pinion in such a way that the toothed rack is adjusted when the pinion is rotated about a pinion axis, whereby means of such adjustment of the toothed rack the adjusters can be moved in relation to one another,
wherein a toothed rack blocking element is affixed to the second adjuster, and the toothed rack, when adjusted, runs between the toothed rack blocking element and the pinion,
wherein the spring means extends as a separate component between the toothed rack blocking element and a spring blocking element spaced apart there from, the spring means comprising a curvature oriented towards the toothed rack in a middle region located between the toothed rack blocking element and the spring blocking element, the curvature being in contact with the toothed rack at a pressure point while exerting a pressure force so as to bias the toothed rack in the direction of the pinion, the curvature being formed by attaching a local thickening to a surface of the spring means in a direction facing an upper side of the toothed rack, the local thickening of the curvature pressing at the pressure point against the upper side of the toothed rack with the pressure force.

15. The adjustment device of claim 14, wherein the spring means is held movably or rigidly on the toothed rack blocking element via wrapping the spring means around the toothed rack blocking element and/or being affixed thereto, where the toothed rack blocking element is a stud bolt projecting off of the second adjuster.

16. The adjustment device of claim 14, wherein between the toothed rack blocking element and the toothed rack a gap is formed when the interlocking of the toothed rack is in contact with the pinion, where the gap is smaller than 1 mm.

17. The adjustment device of claim 14, wherein the spring blocking element is formed by a projection or bar projecting off of the second adjuster, the projection being spaced apart from the toothed rack blocking element, and the spring means being in biased contact with the projection.

18. The adjustment device of claim 17, wherein the spring means is in loose contact with the projection or the bar, and/or a second end region of the spring means is wrapped around the projection or the bar.

19. The adjustment device of claim 14, wherein the pinion can be driven via an operating device, the operating device being an electric operating device or a manual operating device.

20. The adjustment device of claim 14, wherein the adjustment device is adapted for height adjustment of the vehicle seat, the first adjuster being a rear swing arm which is pivoting mounted on a chassis, and the second adjuster being a side part of an underframe of the vehicle seat, the rear swing arm being pivotable in relation to the side part by moving the toothed rack in such a way that the underframe is adjusted in a height adjustment direction.

\* \* \* \* \*